Sept. 22, 1942.  H. W. IBBOTT  2,296,714
AUTOMATIC CONTROL APPARATUS
Filed Oct. 9, 1940
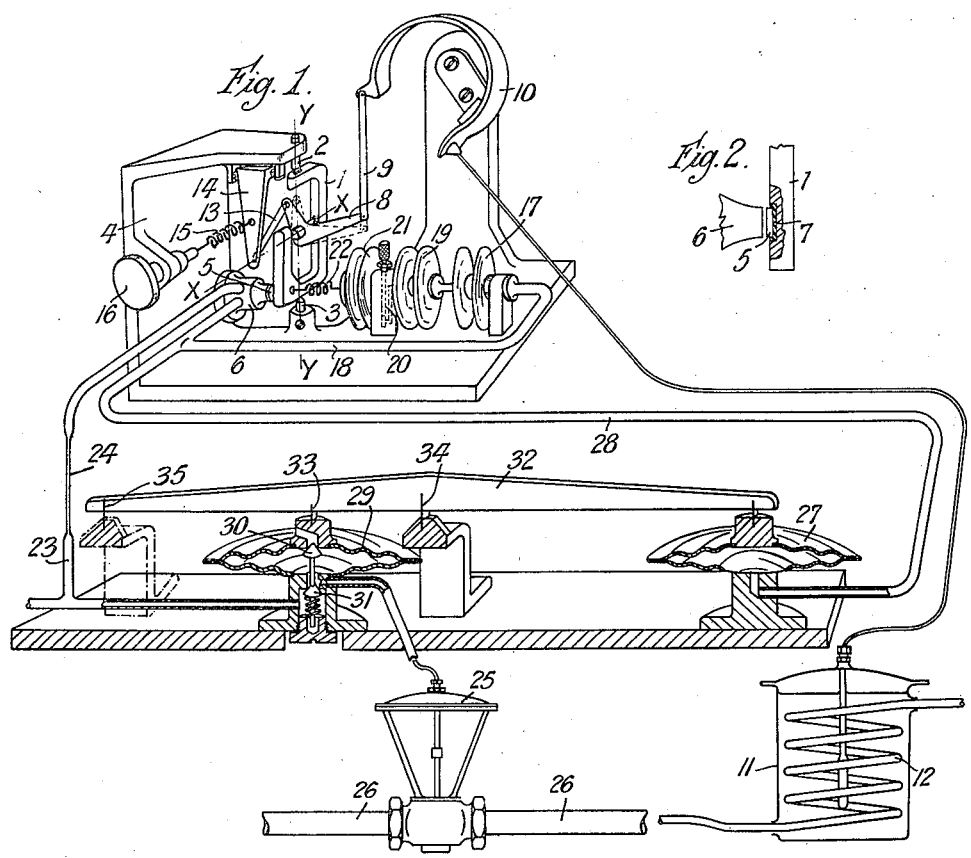
Inventor:
Harold William Ibbott;
By his attorneys,
Baldwin & Wight Patented Sept. 22, 1942

2,296,714

UNITED STATES PATENT OFFICE 2,296,714

AUTOMATIC CONTROL APPARATUS

Harold William Ibbott, London, England, assignor to Negretti & Zambra, London, England Application October 9, 1940, Serial No. 360,518
In Great Britain August 10, 1939

6 Claims. (Cl. 74—1)

This invention relates to control apparatus operating in accordance with changes of a physical condition, for example heat or pressure.

In principle, the automatic apparatus according to the invention comprises a displaceable member subjected to forces, including a force whose effect upon the member, for a given strength of the force, is variably responsive to changes in a physical condition, so that when such change occurs the said member is displaced to an extent dependent upon the amount of said change, and thereby causes actuation to a corresponding extent of control means for varying the physical condition in a sense to counter the change.

Preferably, when the displaceable member is in a normal equilibrium condition corresponding to a desired state of the physical condition and with the control means on a certain setting the force, whose effect upon the member is variably responsive to changes in the physical condition, has no tendency to displace the member. For example the displaceable member may be pivoted and the variation of the effect of the force upon it may be produced by altering the distance of the line of action of the force from the pivot axis, and in the normal equilibrium position the line of action of the force may intersect the pivot axis so that it will not exert a displacing tendency upon the pivoted member.

The force referred to may accordingly be transmitted by a strut bearing against the side of a lever pivoted in the pivoted member about a pivot axis, inclined preferably at right angles to the pivot axis of the pivoted member, the said lever being rockable in response to changes in the physical condition. This strut preferably has the force transmitted to it by a member acting upon it at a point in line with the pivot axis of the lever and so that the circular path of movement of the point of bearing of the strut on the lever will pass through the pivot axis of the pivoted member. The member transmitting force to the strut may be a hinged member subjected to the action of a spring adjustable in strength at will.

According to a further feature of the invention the control means for varying the physical condition is actuated through a relay, for instance a relay according to British Specification No. 524,077 responsive to fluid pressure dependent on the position of the displaceable member which may be achieved by the latter controlling escape of the fluid pressure at a nozzle according to the degree of closeness of the nozzle to an adjacent part of the displaceable member. In such an arrangement the reaction force of the fluid pressure upon the displaceable member may be opposed by a force acting upon the member which is adjustable at will.

Automatic resetting of the control device may be provided for by opposing to the reaction force of the fluid pressure upon the displaceable member a force whose strength is variable according to the fluid pressure, this being effected for example by a capsule device subjected to the fluid pressure in question. Preferably the capsule device or other means for exerting upon the displaceable member a force variable according to the fluid pressure, is operated upon from the fluid pressure with delayed action so that pressure changes of short duration will have no appreciable effect.

There has been indicated above a preferred means of changing the effect of a force upon the displaceable member according to changes in the physical condition to be controlled, but it will be understood that other means for doing this may be used. For instance the displaceable member may be in the form of a rocking arm and the force may be exerted through the roller which moves along the arm to vary the leverage of the force in accordance with movements of an element responsive to the changes in the physical condition. In the normal equilibrium position this roller may bear immediately over the fulcrum of the rocking arm so that it then has no tendency to rock the arm.

The invention is illustrated by way of example in the accompanying drawing (Figure 1) which is partly in perspective and partly in section. Figure 2 shows a small detail.

Referring to the drawing, the displaceable member which has hereinbefore been referred to is shown as a frame I mounted on pivots 2 and 3 in a supporting structure 4 so that it is rotatable about the vertical axis Y—Y. On the left hand corner of the frame I a pallet 5 is mounted on the side adjacent to a nozzle 6. This pallet is shown partially in Figure 1 and is shown in the detail Figure 2. In Figure 2 reference numeral 7 indicates a plastic setting for the pallet so that when the pallet, under certain conditions, is brought to bear against the nozzle it will automatically adjust its setting so as to bear flush upon the nozzle and completely seal it for the time being.

Within the frame I a bell crank lever 8 is pivoted so as to be rotatable about a horizontal axis X—X, one end of the lever being attached by a link 9 to the prime mover 10 (shown as a Bourdon responsive to changes in a physical condition, namely the temperature within a vessel 11 heated by coils 12), whilst against the side of the other end of the lever a bearing is situated upon which bears a strut 13. A hinged arm 14 transmits to the strut 13 a force from the spring 15 and this is in turn transmitted to the bell crank lever. The force from the spring 15 is adjustable at will by means of the knob 16. At a certain predetermined fluid pressure existing within the nozzle 6, the axis Y—Y passes through the bearing point of the strut 13 against the bell crank lever whereby in such position there is no moment of the force exerted by the strut about the axis Y—Y and there is no displacing tendency upon the frame 1. The bearing point of the strut 13 upon the hinged arm 14 lies on the axis X—X. It follows that in this position the pressure of the spring 15 can be varied without altering the predetermined pressure within the nozzle 6.

It will further be understood that when the bell crank lever is rocked in accordance with movement transmitted from the prime mover 10 and the bearing point of the strut 13 moves accordingly away from the Y—Y axis, there will be imposed a turning moment about this axis and the amount will depend upon the extent of displacement and upon the pressure imposed by the strut 13. If the force imposed by the strut 13 is large, then the slight displacement of its bearing upon the bell crank lever from the Y—Y axis will impose sufficient force on the pallet 5 to cause the pressure within the nozzle 6 to rise or fall to the predetermined limiting values. This condition may be referred to as "narrow throttle setting."

If, on the other hand, the force imposed by the strut 13 is very small, a large displacement will be necessary to cause a similar change of pressure within the nozzle 6 and this condition may be called a "wide throttle setting."

In practice it will be found that where the plant leg is small a narrow throttle setting can be found which will give satisfactory control. Where, however, plant lag is large, necessitating a wide throttle setting, an automatic re-setting device is necessary to effect control within narrow limits.

The automatic resetting device shown in the drawing comprises a capsule stack 17 connected to the pressure within the nozzle 6 by the tube 18, and this capsule stack reacts upon a second capsule stack 19. The latter is connected through an adjustable constriction 20 to a third capsule stack 21. The capsule stacks 19 and 21 are both oil filled and as a pressure change occurs within capsule stack 17 its reaction upon capsule stack 19 causes oil to be forced through the construction 20 into the capsule stack 21. The capacity of the latter and the degree of constriction between it and the capsule stack 19 are proportioned so that pressure changes at nozzle 6 of short duration have no sensitive effect whilst those of long duration change the length of the capsule stack 21 and reacting upon the spring 22 change the force on the pallet and cause the pressure within the nozzle 6 to vary until equilibrium is restored.

It is important that the rating of the spring 22 is such that its resultant reaction on the pivoted frame 1 for a certain pressure change at the nozzle shall be less than the increase of force produced directly on the pivoted frame 1 by that same increase of pressure within the nozzle.

The strength of the spring 22 is preferably adjustable at will and this may in effect be produced not directly in this spring but by providing an auxiliary spring (not shown) acting upon the pivoted frame 1 and controlled by a knob.

It will be understood that while the reaction from the strut 13 fluctuates for momentary changes of the physical condition, i. e. in the example shown temperature changes in the heating vessel 11, and thereby controls these, the capsule stack 21 effects a control of only those temperature changes of long duration.

It will be realised that the delayed action between the primary pressure increase at the nozzle 6 and the resultant reaction on the pivoted frame 1 through the spring 22 can also be effected by a suitably arranged dashpot damping or by direct air constriction placed in the air tube 18 serving the capsule stack 17, this latter acting directly on to spring 22, or in fact by any other such known means.

The constriction 20 in the oil line between capsule stacks 19 and 21 may be formed by inserting into the cylindrical bore a suitable length of round wire of slightly smaller diameter than the bore, thus forming a narrow annulus through which the oil passes. By inserting more or less wire into the bore an adjustment of the amount of constriction is obtainable.

The pressure supply to the nozzle 6 comes from an air supply line 23 having in it a constriction 24 designed to reduce the flow to an amount such that the kinetic energy of the jet of air escaping from the nozzle 6 is almost zero, and therefore has no sensible reaction on the pallet 5. Thus practically speaking the only force from the nozzle on the pallet is one caused purely by pressure reaction.

In order that the action of the control means 25 (which in the example shown regulates the steam supply through pipe 26 to the heating coils 12) can be rapid and powerful, a pressure relay device which is the subject of British Specification No. 524,077, is imposed between it and the primary control mechanism according to the invention. This relay is designed to boost up the nozzle pressure and also to enable the volume of control fluid then operating the control means 25 to be increased to the desired amount. This control fluid may be either gas or liquid, but for the purpose of the present description air is the medium chosen. It will be seen from the drawing that in the pressure relay device the air space of the capsule 27 and the pipe 28 leading to it from the nozzle 6 can be small and therefore the pressure changes at nozzle 6 will almost instantaneously be repeated at capsule 27.

For completeness the pressure relay device may be briefly described. Housed within the capsule 29 are valves 30 and 31 rigidly coupled to move together. The upper valve seating is mounted on the free side of capsule 29 and moves with it. When the state of equilibrium is arrived at with no flow either into or out of the capsule 29, both the top and bottom valves are closed and a fixed distance is maintained between the valve seatings. The forces present during the state of equilibrium are such that the force exerted by the lever 32 at the point 33 equals the internal pressure reaction within the capsule 29. When the pressure within the capsule 27 is a minimum the pressure within the capsule 29 is also a minimum and this latter pressure will rise in direct proportion according to the lever arm lengths between the fulcrum and the respective capsules.

It is to be understood that the minimum and maximum values of the pressure range within the capsule 29 can be changed by simply moving the position of the fulcrum 34 whilst maintaining the primary pressure control minimum and maximum values operating within the capsule 27, and also that a reversed relative action between the prime mover 10 and the control means 25 can be accomplished by changing the fulcrum point 34 to a place such as 35 shown in dotted lines. Thus in practice a rise in temperature of the plant being controlled could be made either to open or close the valve within the control means 25 by a simple adjustment.

It will be appreciated that the invention lends itself to a design which is simple and which from the kinematic view point is as nearly perfect as it is possible in practice to construct mechanism of its kind. Theoretically no reaction of the control mechanism beyond that of frictional resistance reaches the prime mover 10 whose position and consequently the effect it has on the control being determined solely by the temperature of the bulb and the heating vessel 11.

Moreover the low pressure employed at the nozzle combined with the trickle flow results in an almost negligible loss of compressed air whilst the air escaping at the pressure relay device only does so after having done work upon the control means and no flow takes place while the state of equilibrium exists within the capsule 29 of the relay.

What I claim is:

1. In automatic control apparatus, an element movable in response to changes in a physical condition; a pivotal displaceable member; means for exerting force independently of said responsive element and independently of changes in said condition; force-transmitting means including a force transmitting member for transmitting force from said force-exerting means to said displaceable member; and connecting means separate from and exclusive of said displaceable member interposed between said responsive element and said force-transmitting member and being movable in response to movement of said responsive element independently of movement of said displaceable member about its pivotal axis for effecting such movement of said force-transmitting member as to vary the distance of the line of action of said force-transmitting member from the pivotal axis of said displaceable member to thereby vary the turning moment applied to said displaceable member by said force-exerting means, said apparatus being free from connections between said responsive element and said displaceable member capable of transmitting force from said responsive element to move said displaceable member about its pivotal axis, whereby said responsive element serves only to condition said force-transmitting means to apply a turning moment to said displaceable member.

2. In automatic control apparatus, an element movable in response to changes in a physical condition; a pivotal displaceable member; a spring for exerting force independently of said responsive element and independently of changes in said condition; force-transmitting means including a force-transmitting member for transmitting force from said spring to said displaceable member; and connecting means separate from and exclusive of said displaceable member interposed between said responsive element and said force-transmitting member and being movable in response to movement of said responsive element independently of movement of said displaceable member about its pivotal axis for effecting such movement of said force-transmitting member as to vary the distance of the line of action of said force-transmitting member from the pivotal axis of said displaceable member to thereby vary the turning moment applied to said displaceable member by said spring, said apparatus being free from connections between said responsive element and said displaceable member capable of transmitting force from said responsive element to move said displaceable member about its pivotal axis, whereby said responsive element serves only to condition said force-transmitting means to apply a turning moment to said displaceable member.

3. In automatic control apparatus, an element movable in response to changes in a physical condition; a pivotal displaceable member, means for exerting force independently of said responsive element and independently of changes in said condition; means for transmitting force from said force-exerting means to said displaceable member including a strut extending substantially transversely to the pivotal axis of said displaceable member; and means connecting said responsive element to said force-transmitting means and being operable in response to movement of said responsive element independently of movement of said displaceable member about its pivotal axis for shifting said strut transversely to its own axis to vary the distance of the line of action of the strut from the pivotal axis of said displaceable member to thereby vary the moment applied to said displaceable member by said force-exerting means, said apparatus being free from connections between said responsive element and said displaceable member capable of transmitting force from said responsive element to move said displaceable member about its pivotal axis, whereby said responsive element serves only to condition said force-transmitting means to apply a turning moment to said displaceable member.

4. In automatic control apparatus, an element movable in response to changes in a physical condition; a pivotal displaceable member; a spring for exerting force independently of said responsive element and independently of changes in said condition; means for transmitting force from said spring to said displaceable member including a strut extending substantially transversely to the pivotal axis of said displaceable member; and means connecting said responsive element to said force-transmitting means and being operable in response to movement of said responsive element independently of movement of said displaceable member about its pivotal axis for shifting said strut transversely to its own axis to vary the distance of the line of action of the strut from the pivotal axis of said displaceable member to thereby vary the moment applied to said displaceable member by said spring, said apparatus being free from connections between said responsive element and said displaceable member capable of transmitting force from said responsive element to move said displaceable member about its pivotal axis, whereby said responsive element serves only to condition said force-transmitting means to apply a turning moment to said displaceable member.

5. In automatic control apparatus, an element movable in response to changes in a physical condition; a pivotal displaceable member; means for exerting force independently of said responsive element and independently of changes in said condition; a lever pivoted on said displaceable member to rock about an axis transverse to the pivotal axis of said displaceable member; a strut connected between said force-exerting means and said lever; and means independent of said displaceable member interposed between said responsive element and said lever and being movable in response to movement of said responsive element for effecting such movement of said strut as to vary the distance of the line of action of said struts from the pivotal axis of said displaceable member to thereby vary the turning moment applied to said displaceable member by said force-exerting means.

6. In automatic control apparatus, an element movable in response to changes in a physical condition; a pivotal displaceable member; a spring for exerting force independently of said responsive element and independently of changes in said condition; a lever pivoted on said displaceable member to rock about an axis transverse to the pivotal axis of said displaceable member; a strut connected between said spring and said lever; and means independent of said displaceable member interposed between said responsive element and said lever and being movable in response to movement of said responsive element for effecting such movement of said strut as to vary the distance of the line of action of said strut from the pivotal axis of said displaceable member to thereby vary the turning moment applied to said displaceable member by said spring.

HAROLD WILLIAM IBBOTT.